US006549224B2

(12) United States Patent
Connor

(10) Patent No.: US 6,549,224 B2
(45) Date of Patent: Apr. 15, 2003

(54) ADJUSTABLE PRINTHEAD LOADING DEVICE AND METHOD FOR DOCUMENT IMAGING APPARATUS

(75) Inventor: Eric J. Connor, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/746,051

(22) Filed: Dec. 21, 2000

(65) Prior Publication Data

US 2002/0080223 A1 Jun. 27, 2002

(51) Int. Cl.$^{7}$ .......... G01D 15/10
(52) U.S. Cl. .......... 347/198
(58) Field of Search .......... 347/198, 197; 400/120.17, 120.16, 120.01

(56) References Cited

U.S. PATENT DOCUMENTS 5,379,056 A 1/1995 Walter et al.
5,448,281 A 9/1995 Walter et al.
5,594,487 A * 1/1997 Nuita et al. .......... 347/197
5,678,938 A * 10/1997 Saito et al. .......... 400/120.17
5,735,617 A 4/1998 Wirth

* cited by examiner

*Primary Examiner*—Lamson Nguyen
*Assistant Examiner*—K. Feggins
(74) *Attorney, Agent, or Firm*—Norman Rushefsky

(57) ABSTRACT

A method and apparatus for recording an image on an image recording medium employs an imaging member in pressure engagement with the medium. The imaging member may comprise a thermal printer in pressure engagement with the medium wherein a donor sheet is between the printhead and the recording medium. In response to sensing an operating parameter of a recording operation, such as pressure, temperature, recording medium type or donor medium type, the position and/or amount of pressure is adjusted.

32 Claims, 5 Drawing Sheets

ADJUSTABLE PRINTHEAD LOADING DEVICE AND METHOD FOR DOCUMENT IMAGING APPARATUS

BACKGROUND OF THE INVENTION

1. Technical Field

This invention relates generally to linear printheads for document imaging apparatus such as printers, copiers, facsimiles, and the like; more particularly, this invention relates to the adjustment of the pressure profile seen by the media at the moment imaging is occurring.

2. Background Art

Document imaging apparatus often includes a printhead consisting of a linear array of print elements that extend across a substantial portion, if not all, of the width of the image to be produced. In many cases the media to be printed on is held against the print elements by a platen roller. There are many factors, such as flexing and thermal distortion of the printhead, the platen roller, and any mounting members, that can cause an undesired pressure variation across the width of the image to be produced. This undesired pressure variation can directly impact image quality. In addition, the pressure profile along the line of print elements can change during the operation of the document imaging apparatus. One example of this is the change in the printhead temperatures in a thermal printer when printing dark vs. light images.

One approach taken in the prior art such as described in U.S. Pat. No. 5,735,617 is to deform the printhead into a desired shape with screws pushing the head away or pulling the head towards another mounting member; the goal presumably being to achieve a desired pressure profile once all the members have flexed and thermally distorted. This method does not allow for adjustments during the operation of the apparatus. Nor does it allow for variations in physical properties of the media, such as thickness and stiffness. Such variations greatly affect the overall force profile.

It should be noted that there exists much prior art describing different ways to adjust the total load applied to the printhead (e.g., U.S. Pat. No. 5,448,281.) Although the present invention also achieves this end, the adjusting of the load distribution along the line of print elements during the operation of the apparatus is made possible as well.

SUMMARY OF THE INVENTION

It is an object of the present invention to provide a device for loading a printhead that allows adjustment of the pressure profile along the print line prior to and during operation of the apparatus.

According to a feature of the present invention, a printhead loading or load applying device includes a plurality of members that can each apply an individually adjustable load to a precise point along the length of the printhead. The location of the point of the applied load is also adjustable for each of these members. Thus, the pressure profile along the print line and the total applied load can be controlled by changing the magnitude and/or location of any (or all) of the loads applied to the printhead.

In accordance with a first aspect of the invention, there is provided a method of recording on an image recording medium using an imaging member in pressure engagement with the medium, the method comprising sensing an operating parameter of a recording operation; and in response to said sensing adjusting a pressure profile operating on the medium by the imaging member.

In accordance with a second aspect of the invention, there is provided an apparatus for recording information on an image recording medium, the apparatus comprising a support for supporting an image recording medium during movement of the image recording medium in a first direction; an imaging member in pressure engagement with the recording medium; a sensor for sensing an operating parameter of a recording operation and generating a first signal relative to sensing of the parameter; a controller responsive to the first signal from the sensor for providing an output signal for adjusting a pressure profile for recording in response to the first signal; and a pressure applying member movable in a direction transverse to the first direction and cooperating with the imaging member to adjust the recording pressure profile of the imaging member upon the recording medium.

In accordance with a third aspect of the invention, there is provided a method of recording on an image recording medium using an imaging member in pressure engagement with the medium, the method comprising sensing an operating parameter of a recording operation upon the recording medium, the recording medium being movable in a first direction; and adjusting the position of a pressure applying member in a direction transverse to the direction of movement of the recording medium to adjust a pressure profile on the recording medium.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
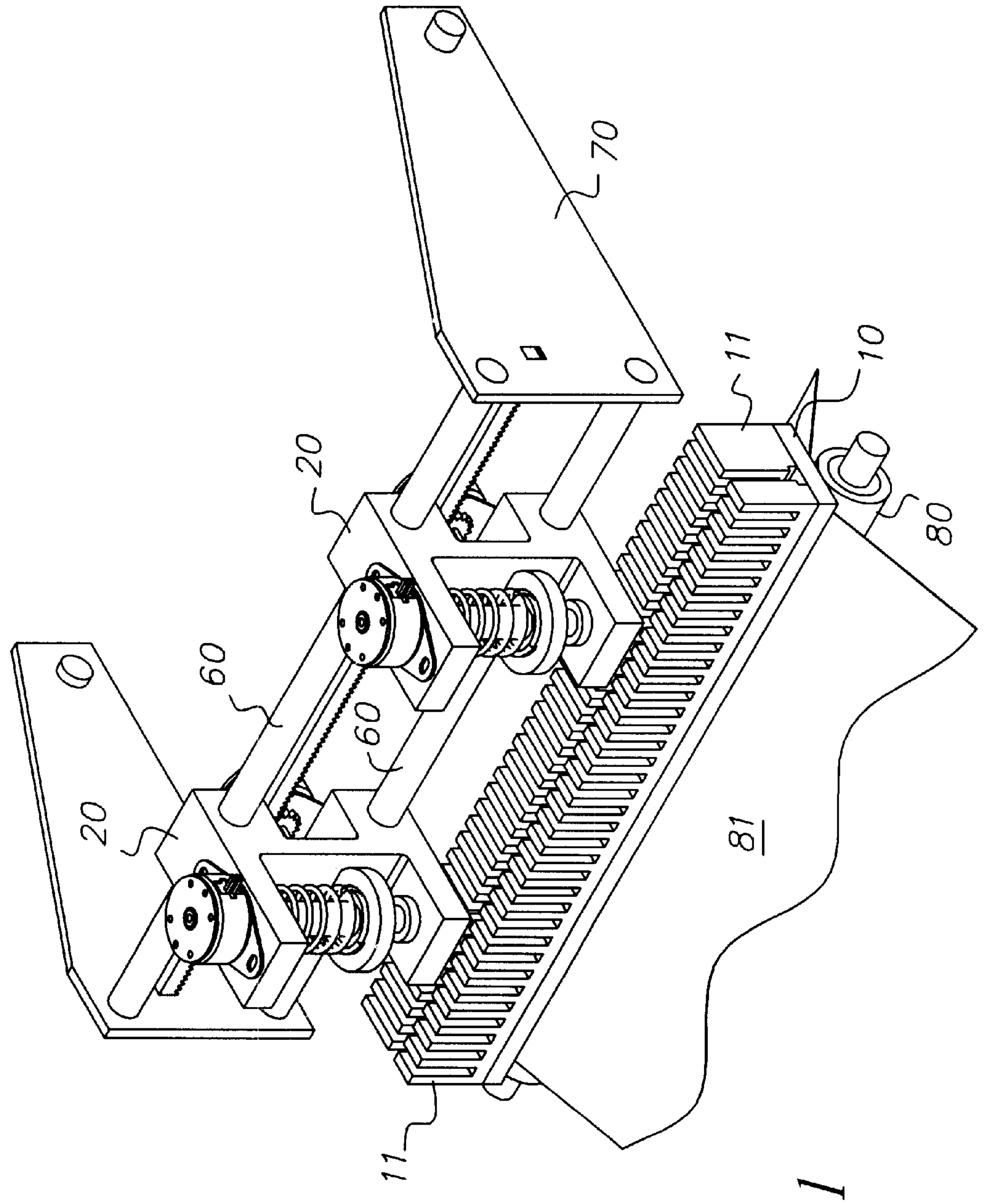
FIG. 1 is perspective view of a preferred embodiment of the present invention.
Figure 2:
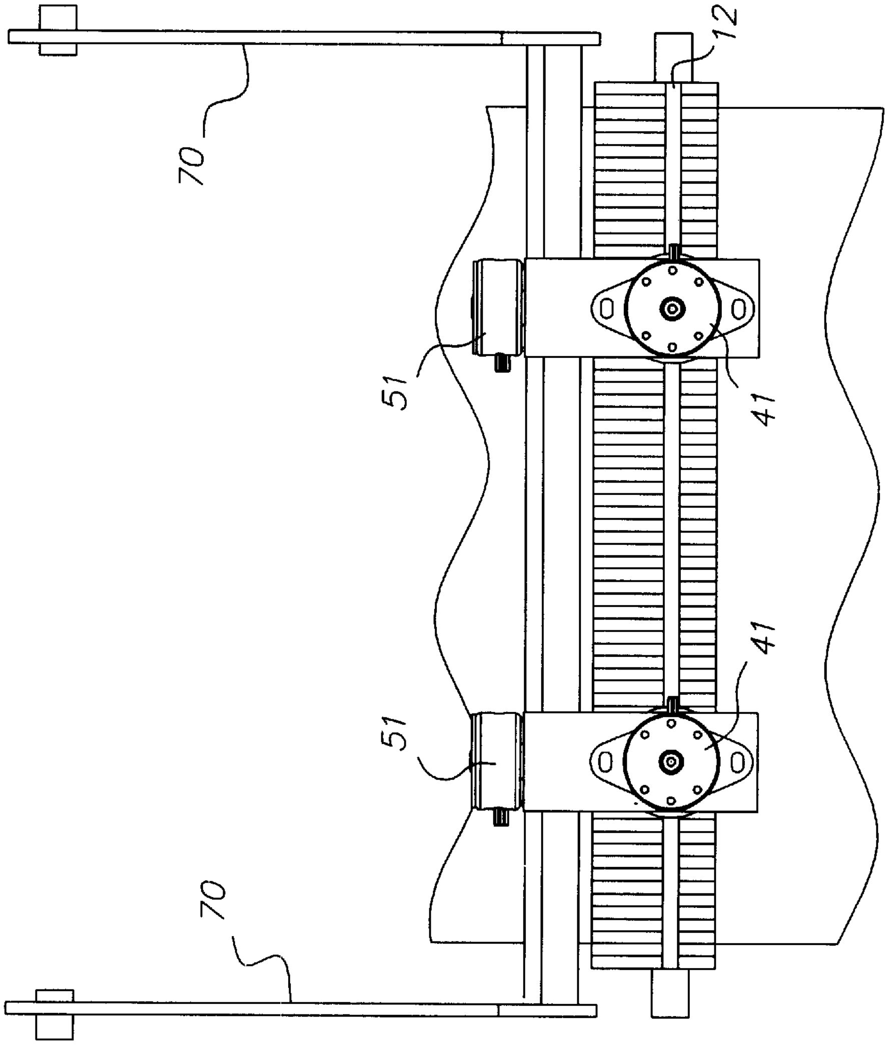
FIG. 2 is a top view of the embodiment shown in FIG. 1.
Figure 3:
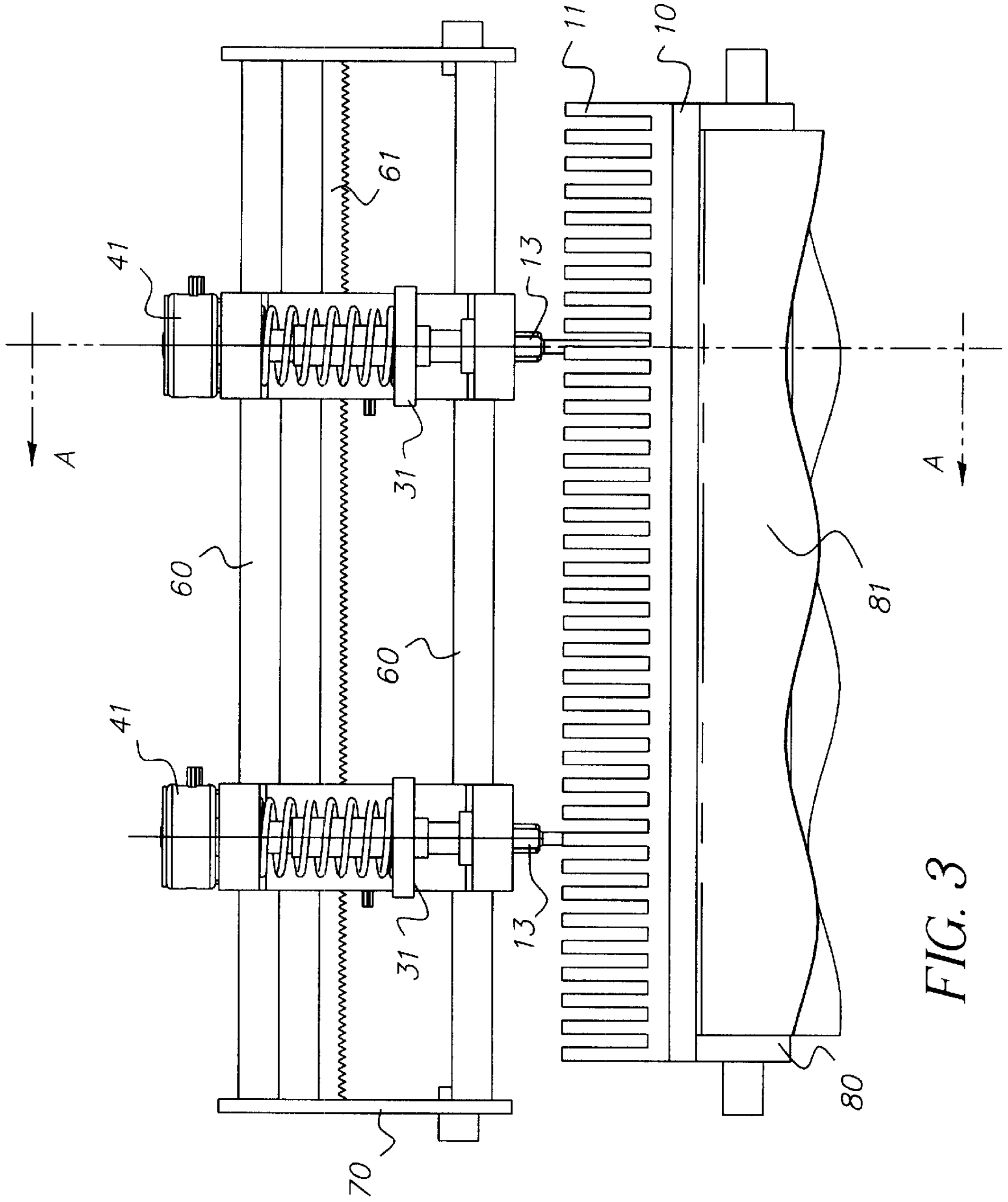
FIG. 3 is a frontal elevational view of the embodiment shown in FIG. 1.
Figure 4:
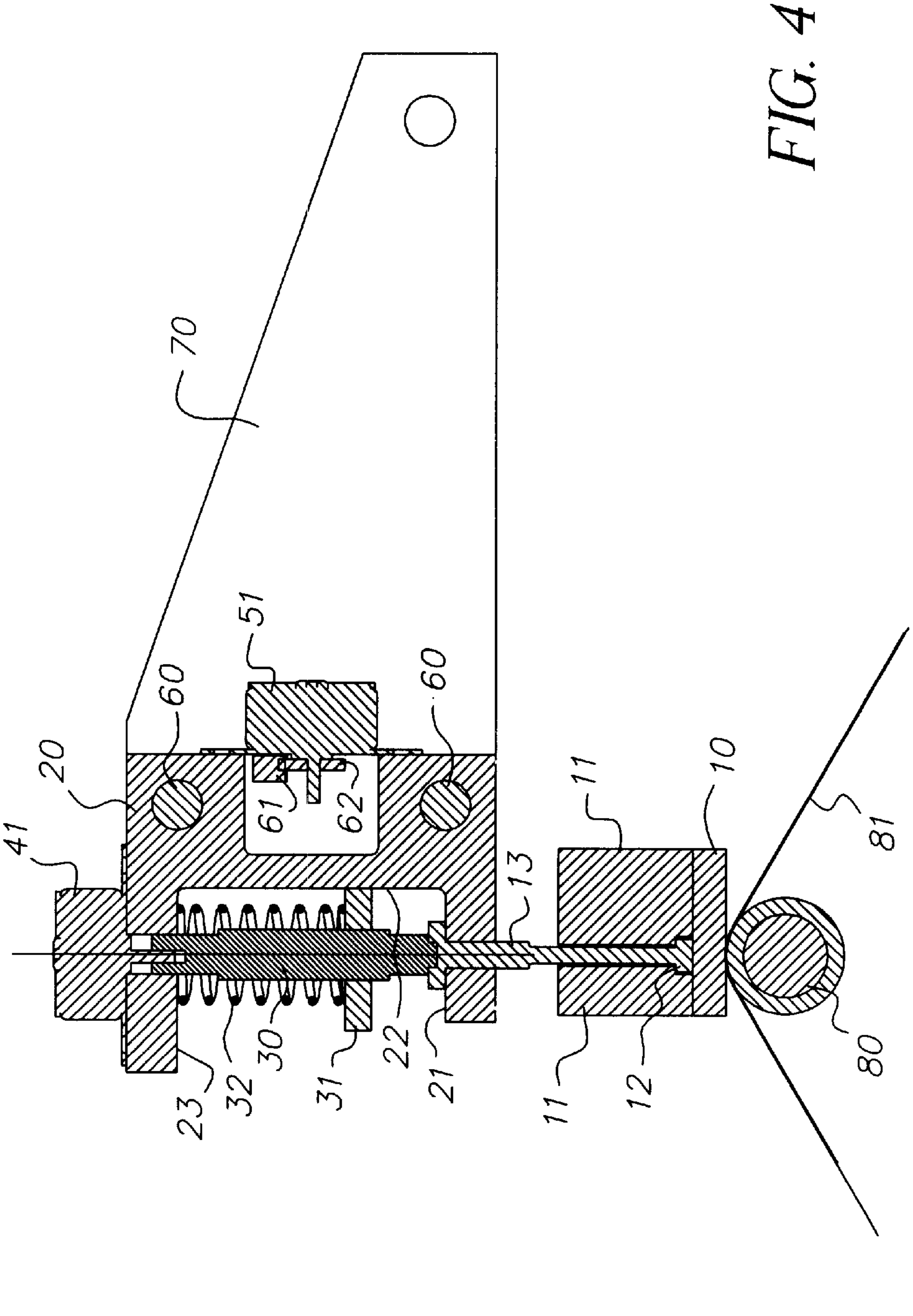
FIG. 4 is a cross-sectional view of the embodiment taken at the line A—A shown in FIG. 3.

The invention to be described below will be described with reference to a thermal printer however as noted above the invention in its broader aspects is not limited to thermal printers but may be used for example with electrographic printers and other printers that would benefit from provision of an adjustable pressure profile during printing.

In the preferred embodiment, the thermal printhead shown may be part of a printer that has a single printhead or a color printer that has a plurality of printheads as described in U.S. Pat. No. 5,379,056. In a thermal printer, as is well known, a print media such as a thermally sensitive receiver sheet or web and a colored donor web are passed into a nip formed between a thermal printhead and a backing roller or platen. The thermal printhead has a series of thermal recording elements arranged along a row perpendicular to or at least transverse to the direction of movement of the thermal media; i.e. the receiver sheet and donor web, through the nip. Typically, the thermal recording elements are uniformly spaced from each other with 300 recording elements per inch being provided in a printhead that may be 8.5 inches long. Of course the printhead may be longer or shorter than that stated and the number of recording elements per inch may be greater or less than that stated. The recording elements are selectively enabled by signals from a printhead controller to heat up sufficiently in response to image recording signals to cause ink or dye from the donor web to transfer to the receiver sheet or web.

Referring to FIGS. 1–4, a printhead 10 having a linear array of print or recording elements, not shown, that extend across a substantial portion, if not all, of an image to be produced is attached to mounts 11 that, in the case of a thermal printhead, are heat sinks. Each mount section has a groove 12 along which a plurality of pressure applying devices in the form of extension rods 13 (see FIGS. 3 and 4) can slide. Each extension rod is associated with a respective carriage 20 and the description provided of the carriage 20 below will also apply to each of the carriages. Although two carriages 20 for adjusting the pressure profile are illustrated, it will be understood that there may only be one of such carriages or more than two of such carriages 20 can be provided.

Each extension rod 13 slides up and down in a hole 13*a* in its respective carriage 20 and is pressed down against the carriage bottom 21 by a loading rod 30 that is threaded over a portion of its length. A nut 31 is threaded on the loading rod 30 and has a flat area that rests against the carriage's sidewall 22 to prevent rotation of the nut 31. A spring 32 lies between the carriage top 23 and the nut 31 to provide the force pressing down on the loading rod 30. A motor 41 is mounted to the carriage top 23, and the motor output shaft is mechanically connected to the loading rod so that when the motor is driven the motor shaft can rotate the loading rod 30 relative to the nut 31 without restricting vertical movement of the loading rod. This allows the distance between the nut 31 and the carriage top 23 to be adjusted, and hence the preload on the extension rod 13 can be controlled.

The carriages 20 can slide along smooth rods 60 that allow translation along the line or row of print elements. Each carriage 20 is positioned along this line by means of a rack 61 and pinion 62 system with a motor 51 controlling the rotation of the pinion 62. The smooth rods 60 are held by a supporting structure 70. This structure 70 is placed into the operating position above the platen roller 80 by other cooperating structures not shown. This could be achieved using a cam, linkage, or some other mechanism. The operating position of the supporting structure 70 is chosen such that each extension rod 13 lifts off slightly from the carriage bottom 21 due to the printhead 10 contacting the platen roller 80 or the media 81 on top of the platen roller 80. This ensures that the load applied by each extension rod 13 to the printhead 10 is controlled by the strength of the spring 32 and the distance between the nut 31 and the carriage top 23. The location of each applied load is determined by the location of the carriages 20 along the smooth rods 60.

Figure 5:
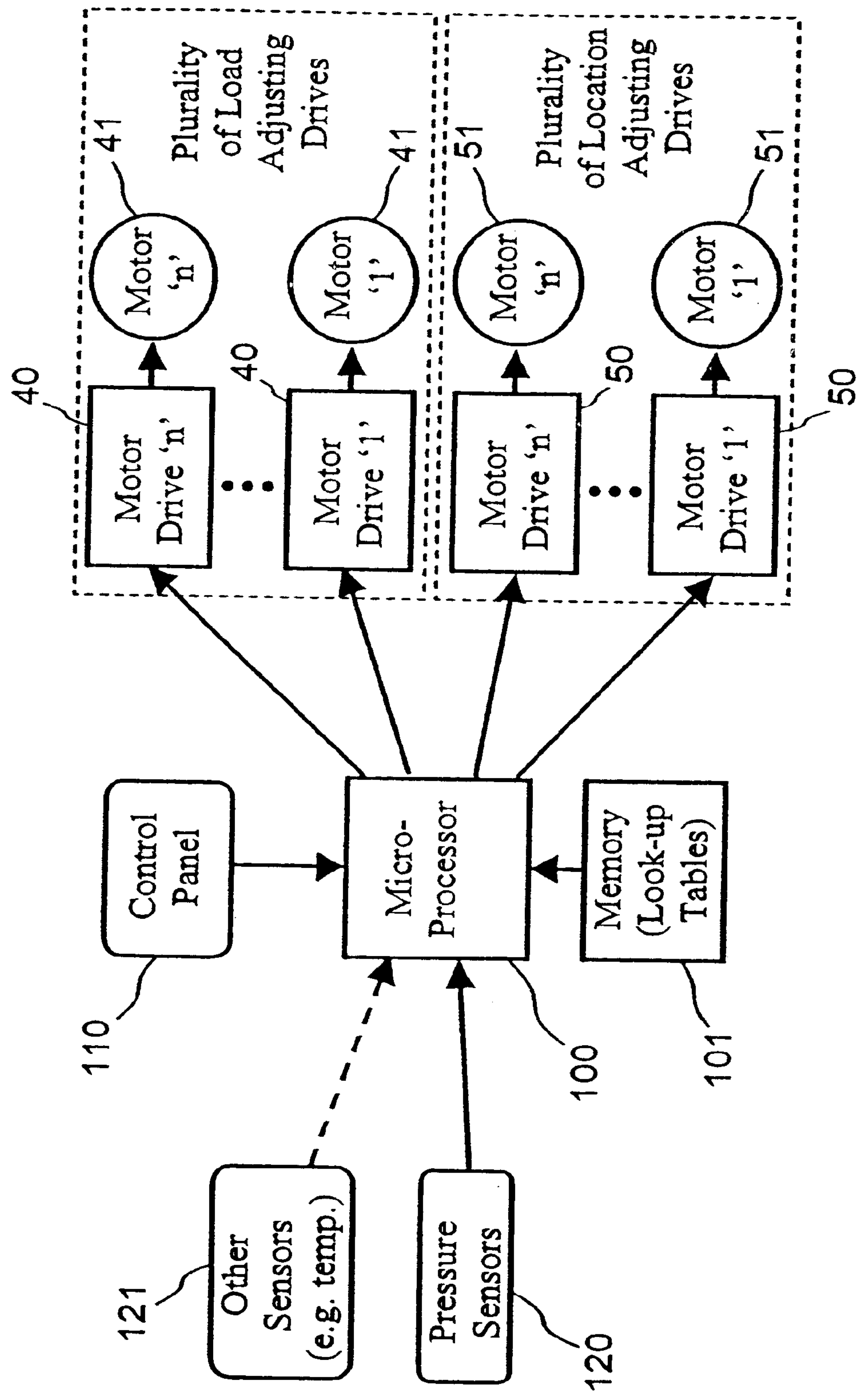
FIG. 5 is a block diagram of control means for the loading device.

Referring now to FIG. 5, a microprocessor 100 controls the printhead loading or applying device or devices. A plurality of pressure sensors 120 provide the microprocessor 100 with information about the current state of the pressure profile along the line of print elements. The pressure sensors 120 would be integrated into the apparatus (using piezo-electric materials in the head, for example, thus a series of piezo-electric devices may be located along the length of the printhead and output signals therefrom are input to the microprocessor 100). As an alternative, other operating parameters, such as head temperatures (such temperatures may be taken by a series of sensors arranged along the length of the printhead and the output of such sensors input to the microprocessor 100), receiver media type (thickness and/or stiffness) and donor type (assuming the apparatus is a thermal printer), could be measured with sensors 121 and/or input by the operator or user via a control panel 110. In the absence of direct pressure measurement in the apparatus, inspection of test images printed under various operating conditions could be conducted to determine the effect of carriage locations and spring loads on image quality. Once optimal carriage locations and spring loads have been found for various responses of the sensors 120 or 121 over the expected operating parameter range, look-up tables associated with the microprocessor are developed and stored in memory 101. The look up tables can store data to be used by the microprocessor for controlling the amount of pressure and location of the pressure applying extension rods to adjust for the conditions sensed by the sensors. During operation, the sensors 120 or 121 are monitored and the microprocessor 100 using inputs from the memory supplies control signals to the plurality of motor drives for adjusting load 40 and carriage position 50. The motors 41 & 51 may have gearboxes to achieve the necessary output torques.

According to the above description, it is found that the present invention offers the following advantages:

According to the above description, it is found that the present invention offers the following advantages:

1. Ability to individually adjust the magnitude of applied load to a plurality of points along the line of print elements in a printhead.
2. Ability to individually adjust the locations of each applied load along the line of print elements in a printhead.
3. Ability to control the pressure profile along the line of print elements during operation in response to sensed changes in various parameters within the apparatus.
4. Excellent image quality over a wide range of operating parameters.
5. Adaptability to manufacturing variations in the components of the apparatus.
6. Adaptability to future changes in media, etc.
7. Ability to accommodate media having variations in physical properties, such as thickness and stiffness, which greatly affect overall force profile.

The present invention has been described with reference to a thermal recording printer; however, the invention finds utility with other printing operations such as electrographic recording wherein the printhead may directly engage the recording medium for electrostatic recording. The term "imaging member" may also comprise a surface that has a marking particle image that is to be transferred to a recording medium. Thus, in electrostatographic recording a marking particle toner image is formed on a primary or secondary toner image recording member, which member, as an imaging member, may be in the form of a belt or a roller and then electrostatically transferred to a recording medium under pressure.

Although the carriage 20 is shown as being moved using a motor with a rack and pinion connection to the rods 60, other means for moving the carriage could include a belt and pulley system, worm gears or a ball and screw connection. Alternative devices for applying the pressure engaging load might be pneumatic or hydraulic cylinders, piezo electric materials, bimetal thermal actuators, or other actuators.

As used herein, the term "pressure engagement" does not necessarily imply direct physical contact between the imaging member and the image recording medium. As described in the preferred embodiment of a thermal printer, a donor medium having a marking colorant such as a dye or ink may be positioned between the thermal printer and the recording medium.

Although the present invention has been described with particular reference to a preferred embodiment, the invention is not limited to the details thereof Various substitutions and modifications will occur to those of ordinary skill in the art, and all such substitutions and modifications are intended to fall within the scope of the invention as defined in the appended claims.

What is claimed is:

1. A printing method of recording on an image recording medium using an imaging member in pressure engagement with the medium, the imaging member having a plurality of recording elements arranged in a second direction transverse to a first direction of movement of the medium, the method comprising sensing an operating parameter of a recording operation upon the recording medium, the recording medium moving in the first direction during the recording operation; and in response to said sensing automatically adjusting the position of a pressure applying member in the second direction for adjusting a pressure profile on a recording medium for recording on the recording medium.

2. The method of claim 1 wherein the imaging member is a printhead, the adjusting of the pressure applying member being provided during movement of the recording medium in the first direction.

3. The method of claim 2 wherein the printhead is a thermal printhead and a donor medium having a marking colorant is located between the printhead and the recording medium for transferring marking colorant to the recording medium.

4. The method of claim 1 and including adjusting a force of the pressure applying member on the imaging member to adjust the pressure profile on the recording medium.

5. The method of claim 1 and wherein pressure sensors are formed integrally on the printhead and in said sensing step outputs of the pressure sensors are sensed as the operating parameter.

6. An apparatus for recording information on an image recording medium, the apparatus comprising:

a support for supporting an image recording medium during movement of the image recording medium in a first direction;

an imaging member in pressure application with a recording medium;

a sensor for sensing an operating parameter of a recording operation during pressure application of the imaging member with the recording medium and generating a first signal relative to sensing of the parameter;

a controller responsive to the first signal from the sensor for providing an output signal for adjusting a pressure profile for recording in response to the first signal;

a pressure applying member movable in a second direction transverse to the first direction in response to the output signal and cooperating with the imaging member to adjust the pressure profile of the imaging member upon the recording medium, wherein the imaging member is a printhead having a plurality of recording elements, the printhead's recording elements being arranged in the second direction; and wherein the pressure applying member comprises an extension rod, a carriage supporting the extension rod for movement in the second direction to permit adjustment of location of application of pressure to the printhead in said second direction.

7. The apparatus of claim 6 wherein the printhead is a thermal recording printhead and a donor medium having a marking colorant is located between the printhead and the recording medium for transferring marking colorant to the recording medium.

8. The apparatus of claim 7 wherein the operating parameter is temperature of the printhead or a printhead component and the sensor is responsive to temperature of the printhead or the printhead component.

9. The apparatus of claim 7 wherein the operating parameter is one or more of the group of parameters consisting of temperature of the printhead or a component of the printhead, recording medium type and donor medium type, and plural sensors are provided that are responsive to different operating parameters for providing respective signals to the controller for adjusting the pressure profile.

10. The apparatus of claim 6 and including a second extension rod supported by a carriage and movable in said second direction to permit adjustment of location of application of pressure to the printhead by said second extension rod.

11. The apparatus of claim 10 and wherein each extension rod is mounted so as to be able to slide towards and away from the printhead, and a respective spring biased loading rod is associated with a respective extension rod, and wherein a motor is connected to each loading rod so that when the motor is driven there is adjustment to a loading force of the loading rod on its respective extension rod.

12. The apparatus of claim 11 and wherein a rack and pinion is connected to the carriage supporting the extension rod for adjusting position of the carriage and thereby position of the extension rod for movement in the direction that is transverse to the first direction.

13. The apparatus of claim 6 and wherein a rack and pinion is connected to the carriage supporting the extension rod for adjusting position of the carriage and thereby position of the extension rod for movement in the second direction.

14. The apparatus of claim 6 and wherein the extension rod is mounted so as to be able to slide towards and away from the printhead, and a spring biased loading rod is associated which the extension rod, and wherein a motor is connected to the loading rod so that when the motor is driven there is adjustment to a loading force of the loading rod on the extension rod.

15. The apparatus of claim 6 and wherein the controller comprises a microprocessor and including a lookup table that stores data to be used by the microprocessor for controlling the amount of pressure to be applied by the extension rod.

16. The apparatus of claim 15 and wherein a lookup table stores data to be used by the microprocessor for controlling location of pressure of an extension rod.

17. The apparatus of claim 6 and wherein the controller comprises a microprocessor and including a lookup table that stores data to be used by the microprocessor for controlling the location in the second direction for application of pressure to be applied by the pressure applying member.

18. A printing method for recording an image on an image recording medium using a printhead in pressure application with the medium, the method comprising:

sensing an operating parameter of a recording operation during recording by the printhead;

in response to said sensing, adjusting a pressure profile operating on the medium by the printhead to provide an adjusted pressure profile used in recording the image on the medium, wherein the printhead has a plurality of recording elements, the printhead recording elements being arranged in a first direction transverse to a second direction of movement of the recording medium; and wherein a carriage supports a pressure applying member for movement in the first direction and the pressure applying member is moved in the first direction to adjust location of application of pressure to the printhead to adjust pressure profile of the printhead on the image recording medium.

19. The method of claim 18 wherein the printhead is a thermal recording printhead and a donor medium having a marking colorant is located between the printhead and the recording medium for transferring marking colorant to the recording medium.

20. The method of claim 19 wherein the operating parameter is temperature of the printhead or a printhead component.

21. The method of claim 19 wherein the operating parameter is one or more of the group of parameters consisting of pressure, temperature of the printhead or a component of the printhead, recording medium type and donor medium type or a characteristic thereof.

22. The method of claim 21 wherein the recording medium moves while in a nip between the support and the printhead, and plural pressure applying members are moved in the transverse direction during recording of information on the recording medium to adjust the pressure profile.

23. The method of claim 22 wherein the printhead includes a heat sink and the pressure applying members move in a transverse slot formed in the heat sink to locate the pressure applying members at different locations along the printhead to adjust the pressure profile.

24. The method of claim 21 wherein the printhead includes a heat sink and the pressure applying member moves in a transverse slot formed in the heat sink to locate the pressure applying member at a different location along the printhead to adjust the pressure profile.

25. The method of claim 18 and wherein a second pressure applying member is supported by a carriage and is moved in said first direction to adjust location of application of pressure to the printhead by said second pressure applying member.

26. The method of claim 25 and wherein each pressure applying member includes an extension rod that is mounted for movement towards and away from the printhead, and a respective spring biased loading rod is associated with a respective extension rod and a respective motor is associated with its respective extension rod and each motor is respectively actuated for adjusting a respective loading force of each respective loading rod on its respective extension rod.

27. A printing method for recording an image on an image recording medium using a printhead in pressure engagement with the medium, the method comprising:

sensing an operating parameter of a recording operation during recording by the printhead;

in response to said sensing adjusting a pressure profile operating on the medium by the printhead to provide an adjusted pressure profile used in recording the image on the medium, wherein the printhead has a plurality of recording elements, the printhead's recording elements are arranged in a first direction transverse to a second direction of movement of the recording medium; and wherein the pressure applying member includes an extension rod that is mounted for movement towards and away from the printhead, and a spring biased loading rod is associated with the extension rod and a motor is actuated and adjusts a loading force of the loading rod on the extension rod.

28. The method of claim 27 and wherein the motor is controlled by a microprocessor.

29. The method of claim 28 and wherein a lookup table provides information to the microprocessor for controlling the amount of pressure and location of a pressure applying member that is used to adjust pressure profile operating on the recording medium by the printhead.

30. A printing method for recording an image on an image recording medium using an imaging member in pressure engagement with the medium, the method comprising:

sensing an operating parameter of a recording operation during recording by the imaging member;

in response to said sensing adjusting a pressure profile operating on the medium by the imaging member to provide an adjusted pressure profile used in recording the image on the medium; and wherein a microprocessor controls a pressure applying member for adjusting the pressure profile operating on the medium.

31. The method of claim 30 wherein the recording medium moves in a first direction while in a nip between a backing member and the imaging member and plural pressure applying members are automatically moved in a second direction transverse to the first direction to adjust the pressure profile on the recording medium and the imaging member is a printhead having a plurality of recording elements arranged in the second direction.

32. The method of claim 31 wherein the pressure applying members are moved during recording of information on the recording medium.

* * * * *